Patented Apr. 14, 1931

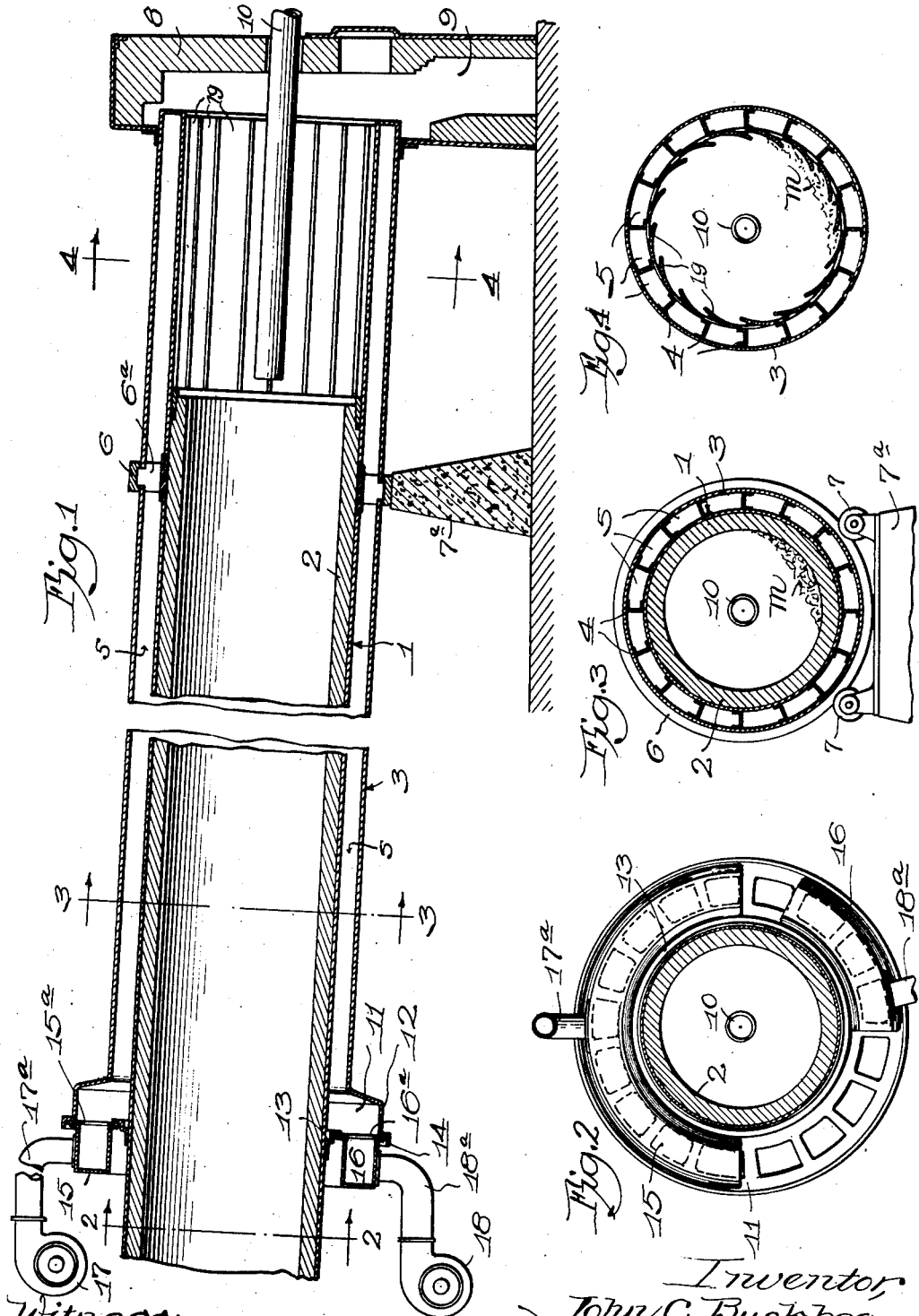

1,800,247

UNITED STATES PATENT OFFICE

JOHN C. BUCKBEE, OF CHICAGO, ILLINOIS

CEMENT KILN

Application filed March 5, 1929. Serial No. 344,126.

This invention relates to improvements in cement kilns, and more particularly to a novel construction for kilns whereby greater efficiency and economy is obtainable by a more effective utilization of the heat which is otherwise lost by radiation through the walls of the kiln and in the cooling of the cement clinker after it leaves the kiln.

As well known in the art, cement is the product of the calcination of certain basic materials, the chief of which are silica and lime. A cement kiln is usually fired by blowing powdered coal into one end by means of an air blast, where it is ignited under proper conditions of combustion to maintain the high temperature required for calcination. The kiln is lined with a refractory material, but due to the high temperatures encountered, this lining is subject to rapid deterioration unless the heat can be carried off by radiation through the wall of the kiln. The heat thus lost by radiation is estimated to be about 10% in the average installation. Moreover, the cement in the form of clinker is discharged from the kiln in an almost incandescent state, and must be cooled before it is ground to its final powdered state. The heat given up by the clinker would also be a loss unless recovered and utilized, as for instance in preheating the air delivered to the kiln.

Manifestly the greater the percentage of heat recovered and utilized, the greater will be the saving in cost of operation, this saving being reflected largely in the fuel consumption. The object therefore of the present invention is to provide a construction of kilns embodying an improved means for more effectively recovering and utilizing the available heat, whereby greater economy and efficiency in operation may be obtained.

The preferred construction of a kiln embodying my invention is disclosed in the accompanying drawings, in which Figure 1 is a view in longitudinal section through a typical cement kiln, showing the improved features of construction.

Figure 2 is a view in cross section taken at line 2—2 of Figure 1.

Figure 3 is a view in cross section taken at line 3—3 of Figure 1, and

Figure 4 is a view in cross section taken at line 4—4 of Figure 1.

It may be stated at the outset that so far as the cooling of the hot clinker is concerned, cement kilns are of two general types, one type having a separate rotary cooler located below the level of the discharge end of the kiln into which the clinker is continuously discharged, and the other having a section of the kiln itself and adjacent the discharge end serve as a cooler or cooling section and forming an integral part of the kiln. The kiln of the present disclosure is of the latter or integral self-contained cooler type.

Cement kilns may differ considerably in size, depending on the capacity for which they are designed, varying from one hundred to two hundred fifty feet in length and as much as ten or twelve feet in diameter. In the present disclosure only a portion of the length of the kiln has been shown, it being understood that except for the novel features set forth the standard practice in kiln design is followed.

In general, a kiln is a tubular metal shell, lined with fire brick or other refractory material, mounted to rotate about its axis, which is set at a slight inclination to the horizontal—sufficient to cause the materials to progress by gravity from one end to the other. The cement clinker is discharged from the lower or depressed end of the kiln. The discharge end is also the firing end of the kiln, that is, the end at which the fuel is introduced. The combustion is not uniform throughout the entire length of the kiln and therefore it may be roughly divided into high and low temperature zones, the former being the region nearer the discharge end. Thus the raw materials are fed to the kiln at the opposite end, and traveling toward the discharge end, are gradually brought up to the temperature of calcination (about 2600° F.) in the high temperature zone.

The portion of the kiln installation shown in Figure 1 embraces the high temperature zone and the cooling section, the latter being an extension of the cylindric shell or tube forming the rotary part of the kiln. A metal shell or tube 1 extends through the entire length of the rotary tube and throughout the high and low temperature zones, the inside of the shell 1 is lined with fire-brick or other refractory material 2. The cooling section is not lined, although the portion of the shell forming the wall of the cooling section is especially constructed, as will later be described. The high temperature zone and the cooling section of the kiln are surrounded by an outer metal shell or wall 3, spaced from the inner wall by longitudinal spacing members such as channel bars 4, set on edge. These spacing sections are spaced apart circumferentially at equal distances and divide the space between the inner or main shell 1 and the outer shell 3 into a plurality of longitudinal passages 5, extending entirely around the circumference of the kiln.

The kiln is supported for rotation about its axis by means of rollers 7 engaging riding rings 6 surrounding the shell 1 at two or more points throughout its length. The rollers are mounted on a standard 7a and are arranged to form a cradle-like support for the ring 6. In this construction the riding ring 6 is slotted intermediate its inner and outer portions so as to provide openings 6a registering with the passages 5.

The discharge end of the kiln is closed or sealed by a firing hood 8 consisting of a stationary metal enclosure having a large opening through which the open end of the rotating shell extends, a suitable connection being made between these relatively moving parts to make the joint air tight. The firing hood rests upon the floor or foundation, having an opening 9 through which the cooled cement clinker is discharged for conveyance to the grinders.

Passing through an opening in the back vertical wall of the firing hood 8 is a pipe 10 extending axially through the cooling section and terminating at the entrance to the high temperature zone of the kiln proper. This pipe communicates with suitable fuel feeding apparatus located adjacent the firing hood and comprising in general, feeders for the pulverized coal, blowers for creating the air blast for conveying the fuel through the pipe 10, and other necessary auxiliaries. This portion of the installation has been omitted inasmuch as it is all of standard design.

The longitudinal passages 5 between the inner and outer shells 1 and 3, as already stated, extend throughout the high temperature zone of the kiln where the maximum heat radiation occurs, and air is conducted through these passages to the cooling section by the following means:

At the end of the outer shell 3, remote from the end of the kiln, is an annular inlet chamber 11 formed by expanding the end of the shell radially as at 12. This chamber opens axially in the form of an annular slot between two concentric channel rings 13 and 14, one surrounding the inner shell 1 and the other being formed at the edge of the outer shell.

Communicating with the air valve chamber 11 are two wind boxes 15 and 16, one extending substantially throughout the upper half of the circumference of the kiln and the other extending throughout a quarter of the circumference of the kiln on one side of the bottom point thereof. The length and position of the smaller and lower wind box is governed by operating conditions which will presently be considered at greater length.

The wind boxes consist of stationary casings, arcuate in shape and opening on one side into the entrance slot to the intake chamber 11. As a preferable arrangement, the wind boxes project slightly through the entrance to the air chamber 11, and have marginal flanges 15a and 16a which extend radially into the channel rings 13 and 14, thus forming sliding joints which may be packed or otherwise treated to make the joints practically air tight.

Connected with the upper wind box 15 is a blower 17, and with the lower wind box a blower 18, pipes or ducts 17a and 18a extending from each blower to its respective wind box. These blowers are represented diagrammatically, although it is understood that they would be mounted near the kiln and driven by motors or other suitable driving means.

The upper and longer wind box 15 is supplied with air at a relatively low pressure, whereas the lower and shorter wind box is supplied with air at a relatively high pressure. Hence the blowers and pipes used for each wind box would differ with respect to the volume and pressure of air delivered.

Referring now to the construction of the cooling section (Figures 1 and 4), it will be observed that the construction of the inner shell differs from that throughout the kiln proper. As clearly shown in Figure 4, the inner wall is made up of a series of longitudinal plates 19 of the same number as there are longitudinal passages 5. Each plate is secured along one longitudinal edge to the inner flange of each spacing section 4, and curving transversely at a slightly greater arc than that of the circumference of the inner surface of the kiln terminate at the free edge in overlapping and spaced relation to its adjacent plate, thereby forming a series of longitudinal slots extending the length of the cooling sections and connecting each passage 5 with the interior thereof. The direction of the opening of these slots is substantially tangential to the circumference of the circle defining the interior of the cooling section. Moreover, these slots open in the same direction, namely, in the direction opposite to that in which the kiln rotates. Thus assuming that the mass of material M is being continually advanced toward the discharge end of the kiln as it rotates, it also seeks its level and therefore is continually rolling and sliding toward the bottom in a clockwise direction from one plate to the next, without dropping through the slots between the plates. It will also be observed that the mass of material M, in the form of clinkers when reaching the cooling section, is not sufficiently fluid to maintain its level in the bottom of the kiln and therefore is distributed throughout a sector of about 45° beyond the low point of the kiln.

Having thus located the mass M of clinker in the cooling section in the kiln, it will now be noted that the high pressure wind box 16 occupies the same relative position and extends throughout the same sector as that covered by the clinker mass. Thus it follows that as the kiln rotates, each passage is brought into the sector covered by the mass of clinker, and likewise into the sector supplied with high pressure air from the wind box 16. Hence streams of air are issuing from the slots through the area covered by the mass of clinker and at a pressure sufficient to be blown through the mass. In like manner air is delivered into the cooling section throughout the upper half of its circumference from the low pressure wind box 15, but since this air does not have to penetrate the clinker mass, its pressure may be considerably less.

The air is delivered from the wind boxes at the normal room temperature, but as it is conducted through the passages it absorbs the heat radiated from the inner shell of the kiln, so that on reaching the cooling section its temperature is greatly increased. The low pressure air enters the cooling section without further heating, but in the case of the high pressure air the same is further heated by the absorption of heat from the clinker as it is blown through the mass, with a resulting cooling effect on the latter.

Thus it will be seen that the air delivered into the cooling section not only carries with it a considerable portion of the heat radiated from the high temperature zone of the kiln, but also the heat removed from the hot clinker as it passes through the cooling section, this heat being immediately returned to the kiln by reason of the fact that upon entering the cooling section it is carried forwardly into the combustion zone of the kiln by suction produced by the blast pipe to support the combustion of the fuel delivered therefrom, and since this air is at an extremely high temperature, the efficiency of combustion is increased proportionally. In other words, translating the firing of the kiln into terms of heat units per pound of fuel burned, it follows that by preheating the air and cooling the clinker in the manner described, an appreciable percentage of the heat units are recovered and returned to the kiln, which otherwise would be lost and therefore necessitating a greater fuel consumption to supply the deficiency.

Having set forth a preferred embodiment of my invention, I claim:

1. A rotary cement kiln having a clinker cooling section adjacent its discharge end and comprising a main shell, an outer shell surrounding said main shell throughout the high temperature zone and cooling sections and forming an annular space divided into a plurality of longitudinal passages, said main shell throughout said cooling section being provided with longitudinal slots connecting said passages with the interior thereof, stationary wind boxes mounted adjacent the end of said outer shell remote from said cooling section, and consisting of arcuate casings adapted to register with the ends of said passages included within predetermined sectors, and blowers connected with said wind boxes.

2. A rotary kiln comprising a cylindric main shell having an inner lining of refractory material throughout substantially the length thereof, and a cooling section forming an extension beyond the firing end, an outer shell surrounding said main shell and divided circumferentially to form a plurality of longitudinal passages, the wall of said cooling section being provided with slots each communicating with one of said passages, a pair of arcuate wind boxes mounted adjacent the opposite ends of said passages and adapted to register with different circumferential groups of said passages corresponding with corresponding sectors of said cooling section, and means for supplying air at different pressures to said wind boxes.

3. A rotary kiln comprising a cylindric main shell having an inner lining of refractory material throughout substantially the length thereof, and a cooling section adjacent one end, an outer shell surrounding said main shell and spaced radially therefrom, radial spacing members between said shells and dividing the same into a plurality of longitudinal passages extending throughout the combustion zone and cooling section of the kiln, said inner shell throughout said cooling section consisting of a plurality of longitudinal plates fixed at one edge to each of said spacing members, with their free edges overlapping the fixed edge of the preceding plate and spaced radially inward therefrom to form slots opening circumferentially and in a direction opposed to the direction of rotation of said kiln, wind boxes mounted adjacent the end of said outer shell remote from said cooling section and adapted to register with the inert ends of said passages, one of said boxes including a group of passages included in an arc extending throughout substantially the upper half of the circumference of the kiln and the other with a group of passages included in an arc adjacent the bottom of the kiln and corresponding to the sector of said cooling section covered by the material passing through the same, and blowers connected with each of said wind boxes.

Signed at Chicago, Ill., this 25th day of February, 1929.

JOHN C. BUCKBEE.